United States Patent [19]

Berg

[11] Patent Number: 5,674,431
[45] Date of Patent: Oct. 7, 1997

[54] USE OF PARAWATER AS DISPERSING AGENT

[76] Inventor: Tore Gustaf Owe Berg, Backavägen 18, S-118 93, Hedesunda, Sweden

[21] Appl. No.: 586,636

[22] PCT Filed: Jul. 13, 1994

[86] PCT No.: PCT/SE94/00690

§ 371 Date: Jan. 18, 1996

§ 102(e) Date: Jan. 18, 1996

[87] PCT Pub. No.: WO95/03883

PCT Pub. Date: Feb. 9, 1995

[30] Foreign Application Priority Data

Jul. 27, 1993 [SE] Sweden ................................. 9302500

[51] Int. Cl.⁶ ...................... B01J 13/00; B01D 17/022; B01D 17/05; B01D 21/00
[52] U.S. Cl. ...................... 252/314; 95/117; 203/5; 203/10; 210/900; 252/313.1; 252/324
[58] Field of Search ............... 252/313.1, 314, 252/324; 210/689, 900; 95/117; 203/5, 10; 423/649

[56] References Cited

U.S. PATENT DOCUMENTS

| | | | |
|---|---|---|---|
| 2,446,997 | 8/1948 | Brewer et al. | 203/5 |
| 2,577,247 | 12/1951 | Irwin | 252/314 X |
| 2,999,795 | 9/1961 | Yagi et al. | 203/5 |
| 3,700,417 | 10/1972 | Broughton | 210/689 X |
| 4,089,749 | 5/1978 | Karamian | 203/10 X |
| 5,376,281 | 12/1994 | Safta | 210/900 X |
| 5,389,298 | 2/1995 | Grosbois | 252/313.1 |

OTHER PUBLICATIONS

V. K. Konyukhov et al., "Spin–modification selective adsorption of water molecules on the surface of a corundum ceramic", Chemical Abstracts, vol. 111, 1989, 111:12878r, p. 371.

V. K. Konyukhov et al., "Ortho–and para–equilibriums in the adsorption of water molecules by the surface of solid carbon dioxide", Chemical Abstracts, vol. 111, 1989, 111:141197s, p. 453.

*Primary Examiner*—Richard D. Lovering
*Attorney, Agent, or Firm*—Young & Thompson

[57] ABSTRACT

A method for preparing a stable colloid in water in which water is enriched with respect to para water by condensing water vapor on a surface which does not decompose water into H and OH, dispersing a water insoluble material in colloidal form therein, whereby excess parawater acts as a stabilizer for the colloid, and storing the colloid in a vessel having a wall which does not decompose water into H and OH. The stability of the colloidal can be later broken by contacting it with a surface that decomposes water into H and OH.

10 Claims, No Drawings

USE OF PARAWATER AS DISPERSING AGENT

REFERENCE TO FOREIGN PRIORITY APPLICATIONS

This application is a 371 of PCT/SE94/00690, filed Jul. 13, 1994, which claims priority based on Sweden application 9302500-5 filed Jul. 27, 1993.

FIELD OF THE INVENTION

The invention described in the following pertains to the production of stable aqueous colloids.

BACKGROUND OF THE INVENTION

Like all other molecules with two H atoms, the $H_2O$ molecule has two different forms, ortho and para, with parallel and anti-parallel nuclear spins, respectively, of the H atoms. At equilibrium at and above room temperature the abundance ratio ortho:para is 3:1 both in the vapor and in the liquid. The two forms may be separated one from the other because they have different vaporization energies, 44 kcal/mol for the para form and zero for the ortho form. The scientific foundation of this statement has been published*.
*T.G. Owe Berg, J. Chim. Phys. 87 (1990) 497.

As a consequence of the statements above, the exchange between vapor and liquid occurs in units of 4 $H_2O$. This is the unit cell if liquid water, i.e. liquid water consists of aggregates of 4 $H_2O$ **. In the evaporation the liquid yields this unit cell at an energy of vaporization of 44 kcal/mol of the unit cell and ¼×44=11 kcal/mol of $H_2O$. In the condensation of the vapor the first step is the formation of unit cells that then aggregate to liquid droplets. The formation of the unit cell requires the participation of a suitable gas, e.g. an oxide of nitrogen. Such gases are abundant in ordinary air.
**T.G. Owe Berg, Tenside Detergents 24 (1987) 151.

Without such a gas the vapor may condense on a surface. If the material is a hydrogen-replacing metal, adsorbed $H_2O$ is decomposed

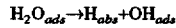

whereupon H is absorbed into the metal and OH remains adsorbed on the surface. The process is reversible. As a consequence there is always an equilibrium between ortho and para water in the adsorbed state. The adsorption as such is reversible.

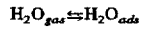

As a consequence the equilibrium of the ortho and para form is maintained between surface and gas too. But if the surface does not decompose $H_2O_{ads}$, the ortho form will be desorbed much faster than the para form. The condensate on such a surface is strongly enriched with respect to the para form.

In the 1960s Derjaguin and his associates published papers on experiments in which steam from ordinary water was conducted through a capillary of pure quartz. The condensate thus formed was collected and studied. It had properties quite different from those of ordinary water. In the U.S.A. many investigators tried to reproduce their experiments. On the whole they were successful with condensation in a quartz capillary. But with a capillary of glass, Pyrex, ordinary water was obtained. If the glass wall was smeared with fat, e.g. stopcock grease, Derjaguin's water was obtained. Because certain properties were similar to those of polymers Derjaguin's water was called Polywater in the U.S.A. A symposium was arranged at which the results were reported. The transactions were published *.

* Polywater Symposium, J. Colloid Interface Sci. 36 (1971) 415–561.

The conclusion at this symposium was that Polywater is ordinary water contaminated by quartz or fat. Derjaguin's results were thus rejected.

The correct conclusion is that Polywater is different from ordinary water in several respects, one being the ability of Polywater to hold more of insoluble substances, namely in colloid form, as compared to ordinary water. An insoluble substance in colloidal dispersion does not affect the vaporization of ordinary water, nor the crystallization of ordinary water. The real reason for the rejection of Derjaguin's results is probably that the universities nowadays are given to teaching and thereby to "explaining" natural phenomena and, therefore, reject every discovery that is not immediately "explained".

I have treated the effect of enrichment with respect to para water on the anomalies of water more generally in a manuscript that I have sent to the Journal of Colloid and Interface Science for publication. I attach this manuscript as an appendix.

SUMMARY OF THE INVENTION

The invention pertains to the use of ordinary water with added para water for dispersing an insoluble substance, and the conversion of the para water to ordinary water for the precipitation of the dispersed substance. The para water is produced e.g. as described above. The dispersion is prepared and stored in a vessel the wall of which does not convert the para water to ordinary water. When precipitation is desired, the dispersion is transferred to another vessel the wall of which converts the para water to ordinary water, or, as an alternative, a metal that thus converts para water is introduced in the storage vessel.

The advantage of this mode of operation, as compared to known ways to prepare and to break a dispersion, is that no chemicals are added.

DESCRIPTION OF THE PREFERRED EMBODIMENT

According to one practical form of the invention, steam is conducted between two parallel vertical plates of copper. These are fitted with inclined grooves through which the condensate is conducted to the edges of the plates where it is collected and conducted away in tubes of copper. The external sides of the plates are cooled by streaming water. The part of the steam that is not condensed, is conducted through a number of narrow tubes of iron to a collecting vessel where new steam in the same amount as the condensate is added whereupon the steam is returned to the copper plates.

An exact method for the determination of the ratio ortho:para in the condensate is the determination of the intensity ratio in the spectrum. An estimate of the surplus of para water is obtained from the freezing point of the condensate.

I claim:

1. A method for preparing a stable colloid in water, which comprises:

enriching the water with respect to para water as compared to water at equilibrium between ortho water and para water, by bringing water vapor to condensation on a surface which does not decompose water into H and OH;

dispersing a water insoluble material in colloidal form in the water enriched with para water, whereby the excess of para water acts as a stabilizer for the colloid; and storing the colloid in a vessel having a wall which does not decompose water into H and OH.

2. A method according to claim 1, wherein said surface which does not decompose water into H and OH is made of a metal not substituting H.

3. A method according to claim 2, wherein said metal is Cu.

4. A method according to claim 1, wherein said surface which does not decompose water into H and OH is made of quartz.

5. A method according to claim 1, wherein said wall which does not decompose water into H and OH is made of a metal not substituting H.

6. A method according to claim 5, wherein said metal is Cu.

7. A method of breaking the stability of a colloid prepared by the method according to claim 1, wherein the colloid is brought into contact with a surface that decomposes water into H and OH.

8. A method according to claim 7, wherein the water decomposing surface is made of a hydrogen substituting metal.

9. A method according to claim 8, wherein said metal is iron.

10. A method according to claim 7, wherein the water decomposing surface is made of glass.

* * * * *